United States Patent
Lomiller et al.

(10) Patent No.: US 12,428,739 B2
(45) Date of Patent: Sep. 30, 2025

(54) HIGH-PRESSURE ELECTROLYZER ASSEMBLY AND VEHICLE WITH AN ELECTROLYZER ASSEMBLY

(71) Applicant: Airbus Defence and Space GmbH, Taufkirchen (DE)

(72) Inventors: Winfried Lomiller, Taufkirchen (DE); Tobias Rambausek, Taufkirchen (DE); Walter Jehle, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 343 days.

(21) Appl. No.: 17/909,515

(22) PCT Filed: Feb. 25, 2021

(86) PCT No.: PCT/EP2021/054667
§ 371 (c)(1),
(2) Date: Sep. 6, 2022

(87) PCT Pub. No.: WO2021/185551
PCT Pub. Date: Sep. 23, 2021

(65) Prior Publication Data
US 2023/0112988 A1    Apr. 13, 2023

(30) Foreign Application Priority Data
Mar. 19, 2020   (EP) ..................... 20164194

(51) Int. Cl.
C25B 9/05      (2021.01)
C25B 1/04      (2021.01)
C25B 9/015     (2021.01)
C25B 15/08     (2006.01)

(52) U.S. Cl.
CPC ............. *C25B 9/05* (2021.01); *C25B 1/04* (2013.01); *C25B 9/015* (2021.01); *C25B 15/08* (2013.01)

(58) Field of Classification Search
None
See application file for complete search history.

(56) References Cited

U.S. PATENT DOCUMENTS 3,382,167 A  *  5/1968  Lord ................... C25B 1/04
                                               204/239
5,837,110 A      11/1998 Dean
2005/0072688 A1   4/2005 Meltser
2005/0077174 A1   4/2005 Brand et al.
2011/0266142 A1  11/2011 Norman et al.

FOREIGN PATENT DOCUMENTS

GB       2460928 A    12/2009

OTHER PUBLICATIONS

Norman et al. "Pressure Dome for High-Pressure Electrolyzer", Tech Briefs, 2012. (Year: 2012).*

(Continued)

*Primary Examiner* — Stefanie S Wittenberg
(74) *Attorney, Agent, or Firm* — Greer, Burns & Crain, Ltd.

(57) ABSTRACT

A high-pressure electrolyzer assembly includes a pressure vessel having two dome-shaped ends, and an electrolyzer arranged inside the pressure vessel. The pressure vessel is pressurized using an inert gas or a process gas of the electrolyzer. A vehicle may include at least one such electrolyzer assembly.

15 Claims, 7 Drawing Sheets

(56) References Cited

OTHER PUBLICATIONS

McLaughlan et al. "Composite Overwrapped Pressure Vessels, A Primer", NASA, Mar. 2011. (Year: 2011).*
English translation DE 102018125788 (Year: 2018).*
English translation CN 1514890 (Year: 2004).*
International Search Report; priority document.
European Search Report; priority document.

* cited by examiner

HIGH-PRESSURE ELECTROLYZER ASSEMBLY AND VEHICLE WITH AN ELECTROLYZER ASSEMBLY

CROSS-REFERENCES TO RELATED APPLICATIONS

This application claims the benefit of the International Application No. PCT/EP2021/054667, filed on Feb. 25, 2021, and of the European patent application No. 20164194.1 filed on Mar. 19, 2020, the entire disclosures of which are incorporated herein by way of reference.

FIELD OF THE INVENTION

The invention relates to a high-pressure electrolyzer assembly and a vehicle having such electrolyzer assembly. In particular, the invention relates to a high-pressure electrolyzer assembly having a pressure vessel with two dome-shaped ends.

BACKGROUND OF THE INVENTION

Fuel cells become more and more important energy sources, particularly in vehicles. Likewise, electrolyzers performing the opposite chemical reaction as a fuel cell, i.e., separating chemically bonded elements by electric current, are more and more in use, in order to produce fuel for fuel cells. For example, water can be electrolyzed into hydrogen (H2) and oxygen (O2). One type of electrolyzer is operated under high pressure, such as 30 bar or higher. Since some electrolyzers are intended to directly produce fuel at a pressure at which the fuel is stored (e.g., at the electrolyzer pressure) or produce fuel, which can be easily compressed in a further step, there is a need for high-pressure electrolyzers. For instance, suitable pressures for fuel storage can be between 100 bar and 200 bar or even much higher, such as up to 700 bar.

Therefore, common electrolyzers are operated under high-pressure, which requires an efficient sealing between electrolyzer cell stacks or plates, since the ambient around the electrolyzer is at atmospheric pressure. In order to avoid leakage from an interior of the electrolyzer to the ambient atmosphere, some electrolyzers were equipped with a portion of a vessel. For instance, an end plate of the electrolyzer is exposed to the exterior, while the electrolyzer cell stack is surrounded by the vessel. Such electrolyzer/vessel structure requires a high strength and, hence, becomes bulky and heavy.

SUMMARY OF THE INVENTION

It is therefore an object of the present invention to provide a lightweight high-pressure electrolyzer assembly and vehicle containing the same.

According to an aspect to better understand the present disclosure, a high-pressure electrolyzer assembly comprises a pressure vessel having two dome-shaped ends, and an electrolyzer arranged inside the pressure vessel. The pressure vessel is pressurized using an inert gas or a process gas of the electrolyzer.

The dome-shaped ends of the pressure vessel provide a high structural strength due to its dome shape. Thus, the entire vessel can be made of a thinner and, hence, lighter structure. The electrolyzer arranged inside the pressure vessel can be operated under a high pressure (e.g., above 30 bar). Thus, when the pressure in the vessel is fully built up, a pressure difference between the interior of the electrolyzer (i.e., the operating pressure of the electrolyzer) and the atmosphere inside the pressure vessel (i.e., the encapsulated atmosphere surrounding the electrolyzer) is quite small. For example, the pressure difference between an interior and exterior of the electrolyzer may be between 0 bar and 10 bar, preferably between 0 bar and 5 bar, and particularly between 0 bar and 2 bar. This allows omitting heavy and complex sealing of electrolyzer cell stacks or plates. These measures further provide for a lightweight high-pressure electrolyzer, and further allows building smaller electrolyzers (due to less structural effort for sealing) or more productive electrolyzers of the same size as conventional electrolyzers with thick sealing material.

Each dome-shaped end may be rotationally symmetric, wherein a rotation axis runs through a peak or pole of the dome-shaped end. A cross-section through the dome-shaped end may have any curved form, such as an arc. In a particular variant, at least one of the dome-shaped ends is a spherical dome or spherical segment with any desired height. Such dome-shaped end, for example, may form a hemisphere, i.e., a spherical segment with a cutting plane passing through the center of the sphere.

Furthermore, the rotation axes of both dome-shaped ends may coincide. Thus, a rotationally symmetric pressure vessel is formed, which provides for a uniform load distribution from to the inner pressure over the entire skin or hull of the pressure vessel.

In a particular variant, the entire pressure vessel may only contain two dome-shaped ends attached to one another. Depending on the size of the electrolyzer the pressure vessel may have the form of a sphere (i.e., three-dimensionally symmetric sphere), the form of an egg (i.e., two dome-shaped ends having different heights along the longitudinal direction of the pressure vessel), or the form of a disk. The longitudinal axis of the pressure vessel connects the peaks or poles of the two dome-shaped ends.

Moreover, since the pressure vessel is pressurized using an inert gas or a process gas of the electrolyzer, the entire weight of the electrolyzer assembly can be reduced compared to conventional vessels filled with water. In particular, the pressure vessel does not have to carry the weight of the water, so that the vessel itself can also be manufactured in a lighter manner.

In case a process gas is used to pressurize the vessel, the electrolyzer assembly can further be manufactured lighter and less complex, since a compressor or other conveying device conveying the gas into the pressure vessel can be omitted. The process gas exiting the electrolyzer can be directly used to fill, pressurize and purge the interior of the pressure vessel. Particularly, if an electrolyzer is operated with a pressurized electrolyte, such as water (H2O) and potassium hydroxide (KOH), the process gas exiting the electrolyzer has a certain pressure, which will pressurize the interior of the pressure vessel.

In an implementation variant, the electrolyzer assembly can further comprise a ring-shaped support, which abuts against an inside of the pressure vessel, and the electrolyzer is mounted to the ring-shaped support. This ring-shaped support allows a uniform transfer of any loads from the electrolyzer into the pressure vessel. The ring-shaped support can abut against the inside of the pressure vessel at any portion of the pressure vessel, including one or both of the dome-shaped ends of the pressure vessel. This can particularly be achieved, if the ring-shaped support and an associated one of the two dome-shaped ends share a common axis of symmetry and an outer surface of the ring-shaped support is formed in correspondence to an inner surface of the dome-shaped end. In an optional variant, the ring-shaped support includes one or more openings or recesses, to accommodate a cable or fluid line. Alternatively or additionally, the ring-shaped support may be segmented, so that the support consists of multiple ring-segment-shaped supports.

Additionally or alternatively, the electrolyzer assembly may further comprise a ring-shaped support, which is mounted to an inside of the pressure vessel, wherein the electrolyzer abuts against an inside of the ring-shaped support. Thus, the pressure vessel can be manufactured to include a support for the electrolyzer, in which the electrolyzer can be inserted. In addition, the abutting of the electrolyzer inside of the ring-shaped support further allows to provide a sliding or gliding bearing, i.e., a bearing having at least one degree of freedom.

In another implementation variant the ring-shaped support can comprise at least one spring element configured to provide a pressure force in a radial direction. The ring-shaped support can be structured or built to provide such flexibility in the radial direction. For instance, the ring-shaped support can have a C-shaped cross-section. Alternatively or additionally, the ring-shaped support may have a separate spring element mounted to a portion of the ring-shaped support, for example a portion against which the electrolyzer abuts or which portion abuts against the inside of the pressure vessel. The spring element may have the form of one more coil springs or the like.

Furthermore, the abutting of the ring-shaped support against the inside of the pressure vessel and/or the mounting of the electrolyzer to the ring-shaped support may allow a sliding of the ring-shaped support along the inside of the pressure vessel and/or a sliding of the electrolyzer along the inside of the ring-shaped support. Such sliding may be limited, so that the sliding can only take place to a certain extent. Thus, any movement or elongation of the electrolyzer, for example due to thermal expansion, can be compensated. The sliding can take place along a longitudinal axis of the pressure vessel, wherein the longitudinal axis of the pressure vessel runs from one dome-shaped end to the opposite dome-shaped end. Specifically, the longitudinal axis of the pressure vessel can connect the peaks or poles of the two dome-shaped ends.

In an optional variant, the ring-shaped support is mounted to the electrolyzer at an end plate of the electrolyzer cell stack. Such an end plate usually provides a particular strength, in order to hold the cell stack together, so that it forms the strongest portion of the electrolyzer for mounting the electrolyzer. The ring-shaped support can optionally be mounted to an inside of the pressure vessel in an area, at which the end plate of the electrolyzer cell stack will be located, once the electrolyzer is inserted into the pressure vessel.

The mounting of the electrolyzer to the ring-shaped support may include fasteners coupling a portion of the electrolyzer, such as the end plate, to the ring-shaped support. For instance, the electrolyzer and the ring-shaped support may have corresponding openings, through which a fastener can be passed. A fastener can include a bolt and nut configuration. Alternatively or additionally, the ring-shaped support may be mounted to the electrolyzer in a force fitting manner and/or form fitting manner. For instance, the ring-shaped support may have a clamping effect onto or around the electrolyzer. Also alternatively or additionally, the end plate of the electrolyzer may have a ring-shaped circumferential line, so that the ring-shaped support is integrated into the electrolyzer end plate.

In a further implementation variant, the pressure vessel has a cylindrically shaped main body portion between the two dome-shaped ends. In this variant, the ring-shaped support can abut only against an inside of the main body portion of the pressure vessel. Such form of the main body portion allows the provision of sufficiently sized surfaces forming the abutting surface of the ring-shaped support as well as the corresponding area of the pressure vessel. Thus, the ring-shaped support may have an L-shaped or T-shaped or U-shaped cross-section, wherein a flat portion of the cross-section abuts against the cylindrically formed inner side of the pressure vessel. Such abutment also allows sliding of the ring-shaped support along the inner surface of the main body portion in a direction parallel to the longitudinal axis of the pressure vessel, i.e., the longitudinal axis of the cylindrically shaped main body portion.

In yet a further implementation variant, the ring-shaped support has a round C-shaped cross-section and/or radial flexible blades. Thus, the ring-shaped support provides a radial flexibility and can function as the spring element besides being a support for the electrolyzer.

In another implementation variant, the electrolyzer assembly may further comprise a tension belt wrapped around the main body portion corresponding to a position of the ring-shaped support. Thus, the main body portion and, hence, the pressure vessel is not required to be built strong enough to withstand any forces induced by the electrolyzer over its entire length, but can be optimized for the internal pressure in the pressure vessel. Any additional forces induced by the electrolyzer via the ring-shaped support (e.g., due to thermal expansion, vibrations and the like) may be taken up by the tension belt. For example, the tension belt can be provided around an exterior region of the main body portion of the pressure vessel.

Alternatively, the pressure vessel, and particularly the main body portion, may have a thickened area corresponding to a position of the ring-shaped support. Thus, the pressure vessel has an area providing the same functionality as a tension belt wrapped around the pressure vessel. Also alternatively or additionally, the pressure vessel, and particularly the main body portion, may have an area made of different and stronger material at a portion corresponding to a position of the ring-shaped support compared to the material at the remaining portions of the pressure vessel.

In addition, the tension belt or thickened area or area of different/stronger material can be provided with at least one mounting flange or tank skirt, which is a corona or a cylindrically shaped ring bonded to the vessel, for mounting the entire electrolyzer assembly.

In another implementation variant, the pressure vessel can be made from metal. For example, steel, particularly stainless steel, aluminum, an aluminum alloy, titanium, and/or a titanium alloy may be used to form the pressure vessel. Likewise, the pressure vessel may be formed from a polymeric material. In order to build a lightweight pressure vessel, a metallic pressure vessel or metallic liner can be provided, which is covered with a composite material. Thus, the metallic portion or liner of the pressure vessel can be kept very thin and, hence, lightweight. The metallic portion or liner of the pressure vessel may form an inner hull of the pressure vessel, since it may be more resistant to any chemical reactions induced by the gases built up inside the pressure vessel. In addition, the metallic liner further has the advantage of a low permeability, particularly with respect to pressurized gases. The composite material may be any (carbon and/or glass) fiber reinforced plastic, such as a woven or nonwoven fiber impregnated with a resin and cured over the metallic portion or liner of the pressure vessel.

In order to build the electrolyzer assembly, the electrolyzer can be inserted into a metallic liner, which is then closed. For instance, one of the two dome-shaped ends can be used to close the metallic liner, for example by welding the dome-shaped end to the remaining form containing the electrolyzer. Afterwards, in an optional manufacturing step, the closed pressure vessel can be covered with a composite material, in order to strengthen the pressure vessel in a lightweight manner. It is to be understood that closing the pressure vessel may also include the provision of flanges at the open ends of two vessel portions, which are mounted together.

In yet another implementation variant the electrolyzer assembly can further comprise a process gas exhaust connected to the electrolyzer and configured to collect process gas from the electrolyzer. A process gas is a gas produced by the electrolyzer during the electrolysis process. The process gas exhaust can have an open end opening into an interior of the pressure vessel. Thus, any process gas produced by the electrolyzer is directly fed into the interior of the pressure vessel. Depending on the pressure of the electrolyte fed into the electrolyzer (i.e., the operating pressure of the electrolyzer), the process gas will leave the electrolyzer at a corresponding pressure, assumingly almost the same pressure as of the electrolyte.

In a further implementation variant, the electrolyzer assembly can comprise a grommet for an electric cable and/or fluid line. A grommet includes at least one sealed through hole in the skin or hull of the pressure vessel. This allows an electric cable and/or fluid line/duct to run from an interior to an exterior of the pressure vessel in a sealed manner, and vice versa. Such grommet allows supplying the electrolyzer with electric energy via one or more cables, with water and electrolyte via at least one duct and/or with a cooling fluid to cool the electrolyzer during operation, and further allows removing process gas and/or pressurizing gas from the electrolyzer as well as from an interior of the pressure vessel.

A grommet can be arranged in one of the dome-shaped ends. For instance, the grommet may be arranged at a peak or pole of the dome-shaped end. Thus, the grommet is arranged at a rotational axis of the pressure vessel, so that any forces acting on the pressure vessel may still be uniformly distributed through the skin of the pressure vessel. Optionally, there can be one grommet in each of the dome-shaped ends of the pressure vessel. This facilitates connecting the electrolyzer with short supply lines/ducts and electric cables and also short exhaust lines/ducts, and, hence, simplifies the overall structure of the electrolyzer assembly.

For example, the grommet can be included or integrated into the metallic liner, such as in the dome-shaped end of the metallic liner. Alternatively or additionally, if the pressure vessel comprises a composite overwrap, the grommet can be integrated into the composite material or may be formed of the same composite material. In any case, a portion of the pressure vessel includes the functionality of the grommet, i.e., forms a feedthrough. Alternatively or additionally, a seal or bush can be employed to form the feedthrough. This seal or bush can be made of Polyether ether ketone (PEEK) or polysulfone (PSU), each with or without reinforcing fibers reinforcement, which provides for electrical insulation. The grommet may have a conical shape, and may further be mounted via a nut, for instance, made out of steel or titanium. Also alternatively or additionally, the grommet may include a ceramic portion or may completely be made out of a ceramic material, which provides for electrical insulation and gas sealing.

In yet a further implementation variant the electrolyzer assembly can comprise a gas outlet comprising a gas duct with an open end opening into an interior of the pressure vessel. The gas duct can run through the grommet towards an exterior of the pressure vessel. Thus, if process gas exiting the electrolyzer is used to pressurize the pressure vessel, the gas outlet allows removing the process gas in an easy manner, while controlling the pressure inside the pressure vessel can be easily achieved. For instance, the gas outlet may comprise a controllable valve to release process gas from an inside of the pressure vessel, while maintaining a desired pressure inside the pressure vessel.

In another implementation variant, the electrolyzer assembly may further comprise a gas inlet comprising a gas duct running through the grommet towards an interior of the pressure vessel. The gas duct can have an open end opening into an interior of the pressure vessel. Such gas inlet can be used to pressurize the interior of the pressure vessel with a gas conveyed into the pressure vessel. Such gas can be process gas of the electrolyzer or may be any other gas suitable for pressurizing the interior of the pressure vessel. For example, an inert gas can be used. Such inert gas conveyed into the pressure vessel can be removed in a controlled manner via the gas outlet.

In case the gas introduced via the gas inlet is different from a process gas of the electrolyzer, the electrolyzer may not be equipped with a process gas exhaust opening into the interior of the pressure vessel. Instead, the process gas exhaust may comprise a process gas duct connecting the electrolyzer (particularly, an outlet of the electrolyzer) with a receiving component for the process gas. Such receiving component (e.g., a storage tank) may be arranged externally of the pressure vessel, so that the process gas duct can be configured to run through the grommet in a sealed manner.

Alternatively or additionally, the pressure vessel can be once pressurized with a gas different from a process gas of the electrolyzer. Thus, the pressure vessel can be maintained under pressure irrespective of the operation of the electrolyzer. For instance, the gas inlet may not be used to maintain continuously gas into the pressure vessel, but may be closed once the pressure vessel has been filled and pressurized. This allows omitting the gas outlet, if it is used only for the gas different from the process gas, such as an inert gas.

In yet another implementation variant, the electrolyzer assembly may further comprise a catalyst arranged in an interior of the pressure vessel and configured to facilitate a reaction of process gases of the electrolyzer into water. Such catalyst allows removing any process gases of the electrolyzer unintentionally leaked from the electrolyzer into the interior of the pressure vessel. This reduces the risk of an uncontrolled chemical reaction between the process gases. As an example only, if one process gas is used to pressurize the pressure vessel, any traces of the other process gas of the electrolyzer would react with the pressurizing process gas. The catalyst allows removing such traces of the other process gas in a controlled manner.

Furthermore, in a particular implementation variant, the electrolyzer assembly can further comprise water collecting means configured to collect water generated by the catalyst. Particularly, the water collecting means are configured to collect liquid water generated by the catalyst. Alternatively, gaseous water (steam) may be collected and liquefied, for instance, via a condenser. Of course, the water collecting means may also be configured to collect any liquid inside of the pressure vessel. For example, the water collecting means may be arranged in a sump (or bottom portion) of the pressure vessel.

In case water is collected by the water collecting means, the water collecting means can be further configured to feed the collected water to the electrolyzer. Since the water is inside of the pressure vessel, it should have only a small or no pressure difference to the water and electrolyte fed into the electrolyzer. This allows an easy way of conveying the collected water into a fed line or duct supplying the electrolyzer.

In accordance with another aspect to better understand the present invention, a vehicle can comprise at least one electrolyzer assembly according to the first aspect. The vehicle can be an aircraft, a spacecraft, a train, a ship, a bus, a car, a truck, etc., which includes means supplying electric energy. This electric energy may be stored by electrolyzing water and an electrolyte and storing at least one of the generated process gases.

In accordance with yet another aspect to better understand the present invention, a building can comprise at least one electrolyzer assembly according to the first aspect. Such building may be a residential or industrial building.

The present disclosure is not restricted to the aspects and variants in the described form and order. Specifically, the description of aspects and implementation variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

BRIEF DESCRIPTION OF THE DRAWINGS

Preferred embodiments of the invention are now explained in greater detail with reference to the enclosed schematic drawings, in which FIG. 1 schematically illustrates a longitudinal section of a variant of an electrolyzer assembly.

DETAILED DESCRIPTION OF THE PREFERRED EMBODIMENTS

Figure 1:
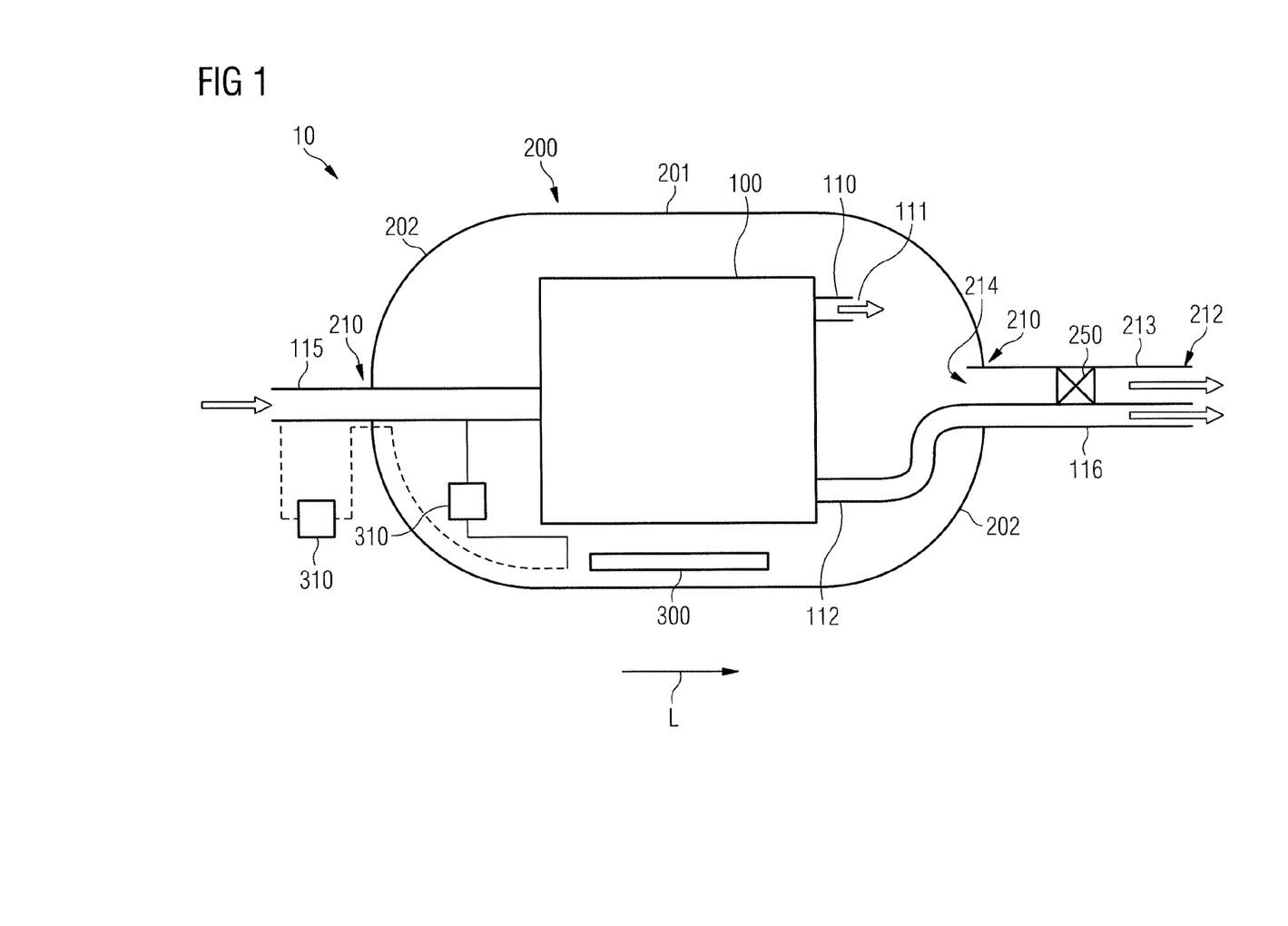

FIG. 1 schematically illustrates a longitudinal section of a variant of an electrolyzer assembly 10 comprising a pressure vessel 200 and an electrolyzer 100 arranged inside the pressure vessel 200. The pressure vessel 200 as illustrated has two dome-shaped ends 202 with a main body portion 201 in-between. The optional main body portion 201, according to the illustrated example, has a cylindrical shape with the same diameter as the widest part of each of the dome-shaped ends 202. As can be seen in FIG. 1, the length of the pressure vessel 200 in a longitudinal direction L can be minimized by minimizing the length of the main body portion 201 or omitting the main body portion 201 at all. The electrolyzer 100 should be arranged inside the pressure vessel 200 without abutting against the inner shell or skin of the pressure vessel 200, since this could damage the shell or skin of the pressure vessel 200 when the electrolyzer 100 moves, for example, due to thermal expansion.

The exemplary electrolyzer assembly 10 has a grommet 210 for an electric cable 215 and/or fluid line 216 (FIG. 3) at each dome-shaped end 202. FIG. 1 illustrates a grommet 210 on the left-hand side for a fluid duct 115 supplying the electrolyzer 100 with an electrolyte, e.g., water (H2O) and potassium hydroxide (KOH). An electric cable supplying the electrolyzer 100 with electric energy has been omitted from FIGS. 1 to 3 for increased legibility of the drawings. On the right-hand side of FIG. 1 a grommet 210 is illustrated for a process gas duct 116 and a gas outlet 212. The process gas duct 116 connects an outlet or exhaust 112 of the electrolyzer 100 for a first process gas generated in the electrolyzer 100.

Furthermore, the electrolyzer 100 has a further process gas exhaust or outlet 110 for a second process gas generated in the electrolyzer 100. This process gas exhaust 110 is connected to the electrolyzer 100 and configured to collect process gas from the electrolyzer 100, while having an open end 111 opening into an interior of the pressure vessel 200. The second process gas exiting the open end 111 is used to pressurize the interior of the pressure vessel 200. In order to release and collect the second process gas from the electrolyzer assembly 10, the electrolyzer assembly 10 includes the gas outlet 212. The gas outlet 212 comprises a gas duct 213 with an open end 214 opening into an interior of the pressure vessel 200, while the gas duct 213 runs through the grommet 210 towards an exterior of the pressure vessel 200. A control valve 250 may be arranged in the gas duct 213, in order to control a volume flow of process gas flowing through gas duct 213 and, hence, in order to control a pressure inside the pressure vessel 200.

The electrolyzer assembly 10 can further include a catalyst 300 arranged in an interior of the pressure vessel 200. The catalyst 300 is configured to facilitate a reaction of process gases of the electrolyzer 100. This reaction may result in the generation of water, for example, if the process gases are hydrogen and oxygen. Due to the high temperature of the electrolyzer 100, and, hence, inside of the pressure vessel 200 the generated water may be vapor. Thus, removal of the vapor from the interior of the pressure vessel 200 may be achieved via a condenser (not illustrated). Such condenser may be arranged separately inside or outside of the pressure vessel 200 or at the gas outlet 212.

In case the water is liquefied or any other liquid is present inside of the pressure vessel 200, a water collecting means 310 may be arranged inside of the pressure vessel 200 or outside of the pressure vessel 200 (this latter option is additionally illustrated in FIG. 1). The inside water collecting means 310 may convey the water into the fluid duct 115, through which it is fed into the electrolyzer 100 (again). The exterior water collecting means 310 has to be connected via a duct (illustrated in dashed lines), which has to run through the grommet 210. The exterior water collecting means 310 saves space inside the pressure vessel 200 and, hence, allows provision of a smaller pressure vessel 200. Since the collected water or liquid is under pressure, the exterior water collecting means 310 has to be configured to reduce the pressure of the water or liquid. The inside water collecting means 310, on the other hand, avoids a further duct running through the grommet 210 and further avoids or at least reduces the effort for pressurizing the water before fed to the fluid duct 115. In case a pressurizing means or conveying device for the collected water is installed inside of the pressure vessel 200, the electric current provided for the electrolyzer 100 can be used to operate such pressurizing means or conveying device. Thus, there is no necessity for a separate/independent energy supply. In addition, if the collected water is fed back to the electrolyzer 100, the interior and exterior water collecting means 310 comprises means to filter the collected water or liquid, in order to block any other substance than water. Of course, although not illustrated in FIG. 1, any collected (and filtered) water may first be fed to a water tank (not illustrated), preferably an external water tank to save space inside the pressure vessel 200. From this water tank the collected water is conveyed into the electrolyzer 100.

Figure 2:
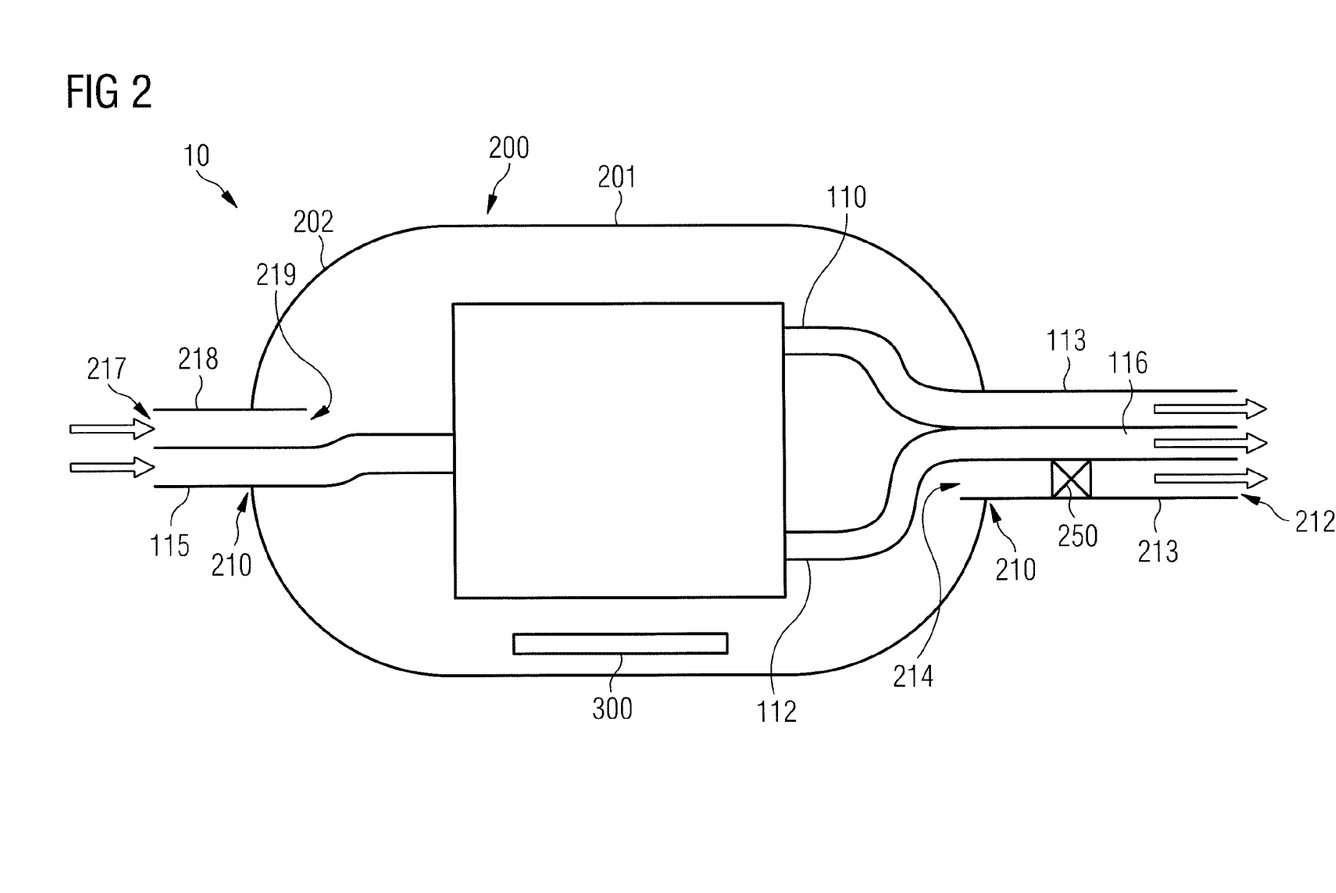
FIG. 2 schematically illustrates a longitudinal section of another variant of an electrolyzer assembly.

FIG. 2 schematically illustrates a longitudinal section of another variant of an electrolyzer assembly 10. The pressure vessel 200 and electrolyzer 100 are the same as in the variant of FIG. 1. Instead of directly pressurizing the pressure vessel 200 via a process gas exhaust 110 having an open end 111 (see FIG. 1), the variant of FIG. 2 has two process gas ducts 113, 116, each for removing one of the process gases from the electrolyzer 100.

Pressurizing of the pressure vessel 200 is achieved by a conveying a gas through a gas inlet 217, which comprises a gas duct 218 running through the grommet 210 towards an interior of the pressure vessel 200. The gas duct 218 has an open end 219 opening into an interior of the pressure vessel. Thus, by guiding gas through gas inlet 217 the interior of the pressure vessel 200 can be pressurized. Likewise, a gas outlet 212 including gas duct 218 and optional control valve 250 as in FIG. 1 can be employed to remove gas from the interior of the pressure vessel 200 and to maintain the pressure inside of the pressure vessel 200. The gas used for filling and pressurizing the interior of the pressure vessel 200 can be an inert gas or one of the process gases, but in this case fed from an exterior to an interior of the pressure vessel 200.

Figure 3:
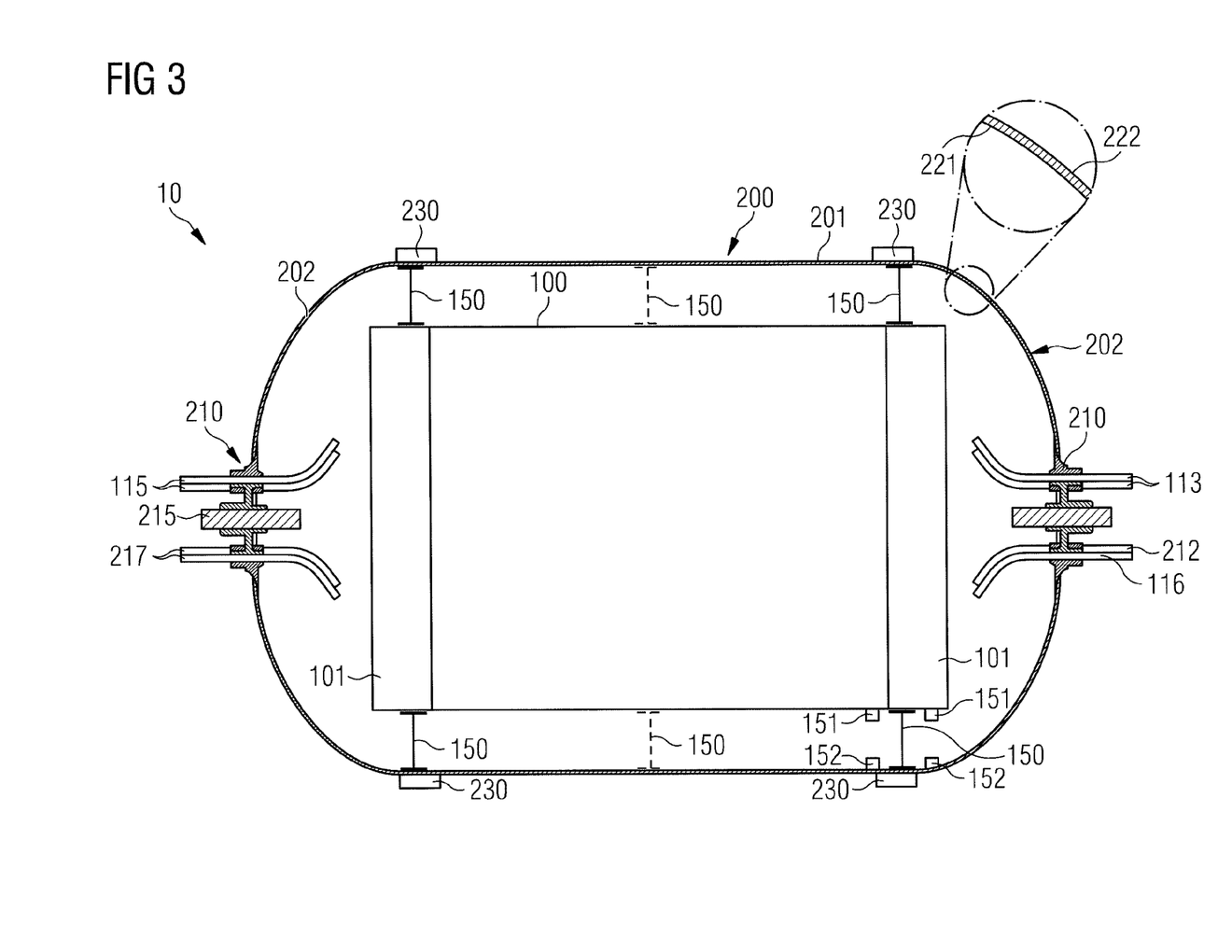
FIG. 3 schematically illustrates a longitudinal section of a further variant of an electrolyzer assembly.

FIG. 3 schematically illustrates a longitudinal section of a further variant of the electrolyzer assembly 10. Particularly, further details of the pressure vessel 200 and the arrangement of the electrolyzer 100 inside of the pressure vessel 200 are illustrated and explained with respect to FIG. 3. The connections of the electrolyzer 100 with supply ducts 115 and process gas ducts 113, 116 as well as any gas inlets 217 and gas outlets 212 are only illustrated at the grommet 210. It is to be understood that any of the variants of FIGS. 1 and 2 can be employed with the electrolyzer assembly 10 of FIG. 3.

As illustrated in FIG. 3, the pressure vessel 200 has a cylindrically shaped main body portion 201 between the two dome-shaped ends 202. The electrolyzer assembly 10 further comprises a ring-shaped support 150 which abuts against an inside of the pressure vessel 200, here the cylindrically shaped main body portion 201. The ring-shaped support 150 can be disposed at an end plate 101 of the electrolyzer 100, but may optionally be disposed at any location of the electrolyzer 100 (as optionally illustrated in dashed lines in FIG. 3).

In order to compensate for any forces induced by the ring-shaped support 150, a tension belt 230 may be wrapped around the main body portion 201 at a corresponding position of the ring-shaped support 150. Instead of an explicit tension belt 230, the material of the pressure vessel 200 may be thickened, in order to compensate for the additional forces induced by the ring-shaped support 150. Furthermore, the pressure vessel 200 may include a metal layer 221, which is optionally covered with a composite material 222. Instead of a tension belt 230, the metal layer 221 and/or the composite material 222 may be thickened at a position corresponding to the ring-shaped support 150.

As can be derived from FIG. 3, the ring-shaped support 150 abuts against an inside of the pressure vessel 200 and further abuts against the electrolyzer 100. One or both of these abutting portions may be configured to slide. One or both of these abutting portions may be mounted to the inside of the pressure vessel 200 and/or the electrolyzer 100. For instance, an outer surface of the electrolyzer 100 may slide along the ring-shaped support 150, while the ring-shaped support 150 is fixed/mounted to the pressure vessel 200, for example welded or glued to the pressure vessel 200. Additionally or alternatively, the ring-shaped support 150 may slide along an inner surface of the pressure vessel 200, while the ring-shaped support 150 can optionally be fixed/mounted to the electrolyzer 100. In any case, stoppers 151 may be arranged at the electrolyzer 100 and/or stoppers 152 may be arranged at an inner surface of the pressure vessel 200, in order to restrict the extent of sliding movement of the ring-shaped support 150 with respect to the electrolyzer 100 and the pressure vessel 200, respectively. It is to be understood that the stoppers 151, 152 are only illustrated with respect to one ring-shaped support 150 for increased legibility of FIG. 3, but can be provided at a plurality of the ring-shaped supports 150 or all of them.

The ring-shaped support 150 can further be fixed to the inner surface of the pressure vessel 200 or alternatively may be fixed/mounted to the electrolyzer 100 in a non-sliding manner. In this case, it would be sufficient, if one abutting portion of one of the ring-shaped supports 150 can slide, in order to compensate for thermal expansion of the electrolyzer 100 or similar forces.

The pressure vessel 200 may further comprise a pressure relief, for example in form of a burst disc 240. This provides for a controlled release of pressurized gas inside of the pressure vessel 200, in case of a critically high pressure. Of course, the pressure relief may also be implemented as a pressure relief valve.

Figure 4:
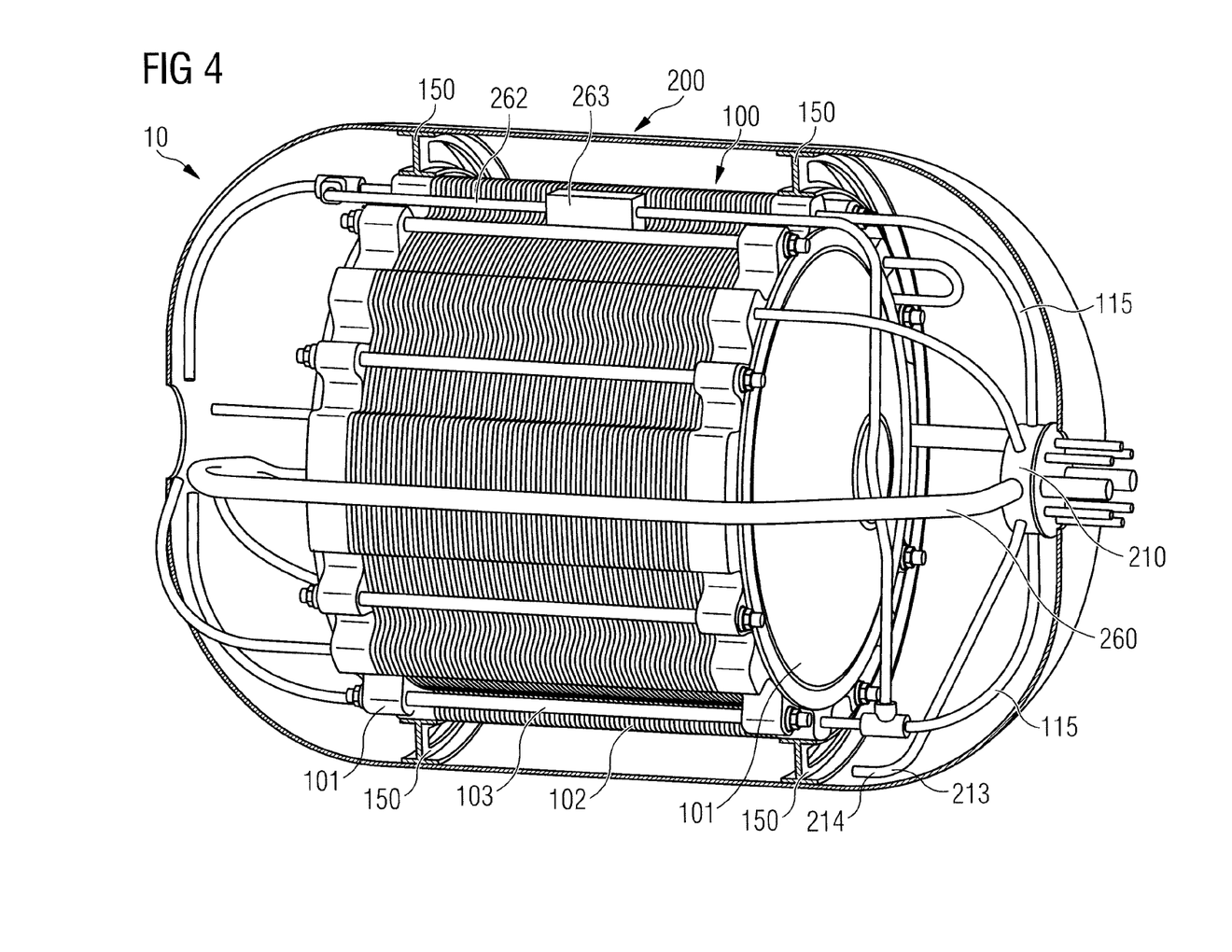
FIG. 4 schematically illustrates a perspective view of a partially cut open electrolyzer assembly.

FIG. 4 schematically illustrates a perspective view of a partially cut open electrolyzer assembly 10, in which particularly pressure vessel 200 of the electrolyzer assembly 10 is partially cut open, and the ring-shaped supports 150 are also cut. The electrolyzer 100, however, is fully illustrated, and includes two oppositely arranged end plates 101. Between the end plates 101, a stack of electrolyzer cells 102 is arranged, and the electrolyzer cells 102 are held and are slightly compressed between the end plates 101 via, for example, bolts 103. The ring-shaped supports 150 are arranged at the circumference of the respective end plate 101, to which it may be coupled in a sliding manner or to which it may be fixedly mounted. For instance, the ring-shaped support 150 may be coupled to the circumference of the respective end plate 101 in a formfitting and/or force fitting manner. Alternatively, the ring-shaped support 150 may be integrated into the circumference of the end plate (not illustrated).

The electrolyzer 100, and particularly the stack of electrolyzer cells 102, is supplied with electrolyte via fluid line 115. In case gas (bubbles) is/are built in fluid line 115 or even inside of the electrolyzer 100, such gas can be collected via a gas collecting duct 262 and may be released via a membrane 263 into the interior space of the pressurized vessel 200. A gas outlet 212 may be arranged, that has a gas.

213 is an open and 214 opening into the interior of the pressure vessel 200 (see also FIGS. 1 and 2). An electric cable has been omitted in FIG. 4 for sake of brevity of the drawing.

In order to cool the electrolyzer 100, which usually generates heat during operation, grommet 210 may further allow a cooling fluid line 260 to pass into the interior of the pressure vessel 200. Cooling fluid line 260 may be coupled to a cooling circuit running through the interior of the electrolyzer 100.

Figure 5A:
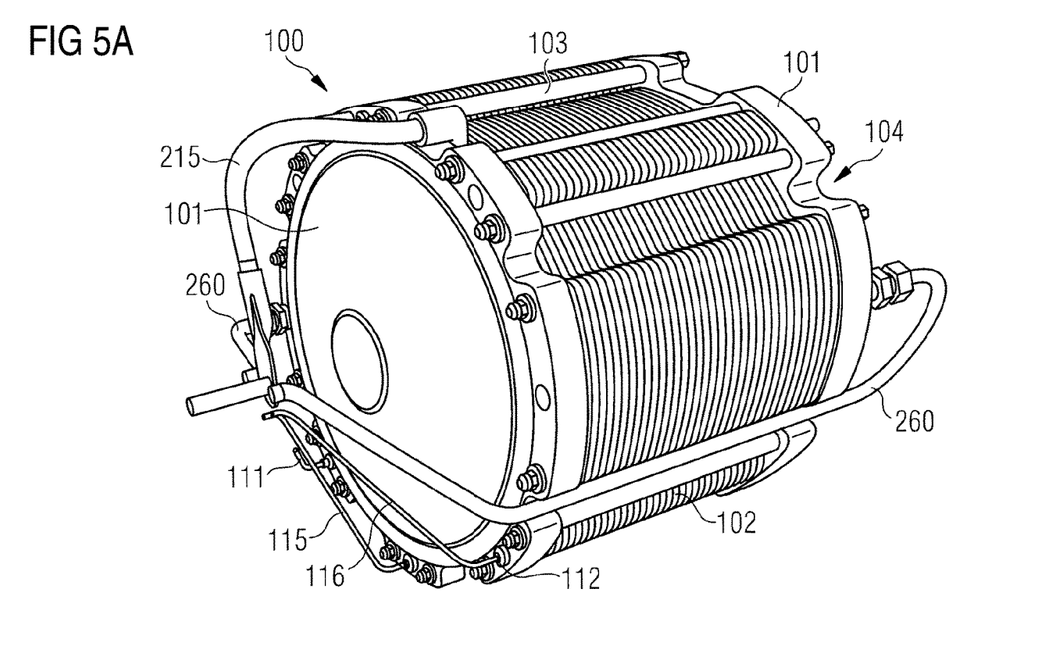
FIGS. 5A and 5B schematically illustrate a perspective view (5A) and a side view (5B) of an electrolyzer assembly.
Figure 5B:
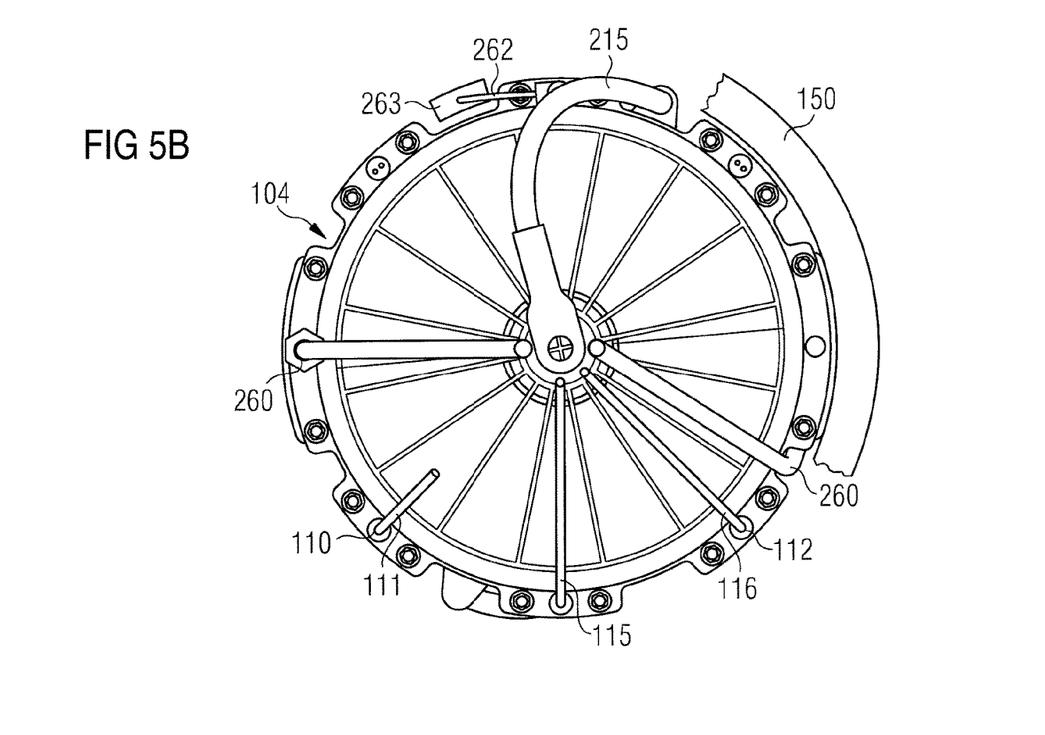

FIGS. 5A and 5B schematically illustrate a perspective view (5A) and a side view (5B) of another electrolyzer assembly variant. In this drawing the pressurized vessel 200, the grommet 210 and the majority of the ring-shaped support 150 have been omitted for sake of brevity of the drawing. FIGS. 5A and 5B illustrate a side of the electrolyzer 100, which corresponds to the right-hand side of, for example, FIG. 1. Thus, a first process gas duct 116 connects an outlet 112 of the electrolyzer 100 for a first process gas, e.g., oxygen (O2). A second process gas exits the electrolyzer 100 at outlet 110, particularly via an open end 111 opening into the interior of the pressure vessel 200. A gas collecting duct 262 may be arranged, preferably, at a top portion of the electrolyzer 100, so that any gas bubbles can collect at duct 262 and may be released via membrane 263 into the interior of the pressurized vessel 200.

At least one cooling fluid line 260 provides a cooling fluid to the electrolyzer 100. Particularly, a first cooling fluid line 260 enters the electrolyzer 100 at one end plate 101 (left-hand side in FIG. 5), while cooling fluid may exit the electrolyzer 100 at the opposite end plate 101 (right-hand side in FIG. 5) and is guided back to the grommet via a second cooling fluid line 260. In addition, an electric cable 215 is illustrated, which allows provision of an electric current to the electrolyzer 100.

Figure 6A:
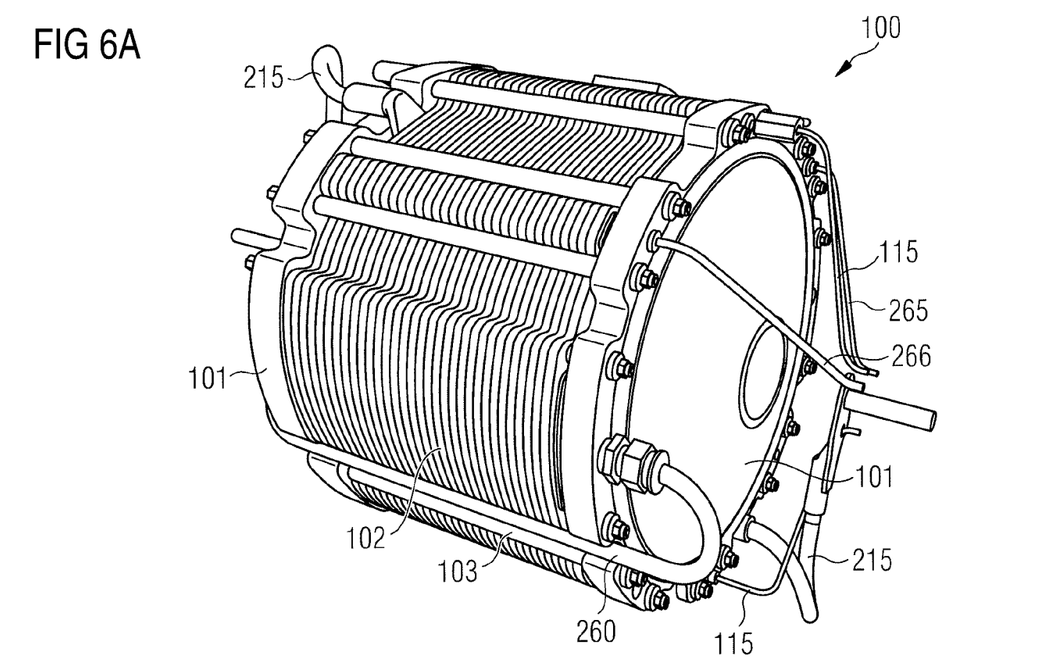
FIGS. 6A and 6B schematically illustrate an opposite perspective view (6A) and side view (6B) of the opposite side of the electrolyzer assembly of FIG. 5.
Figure 6B:
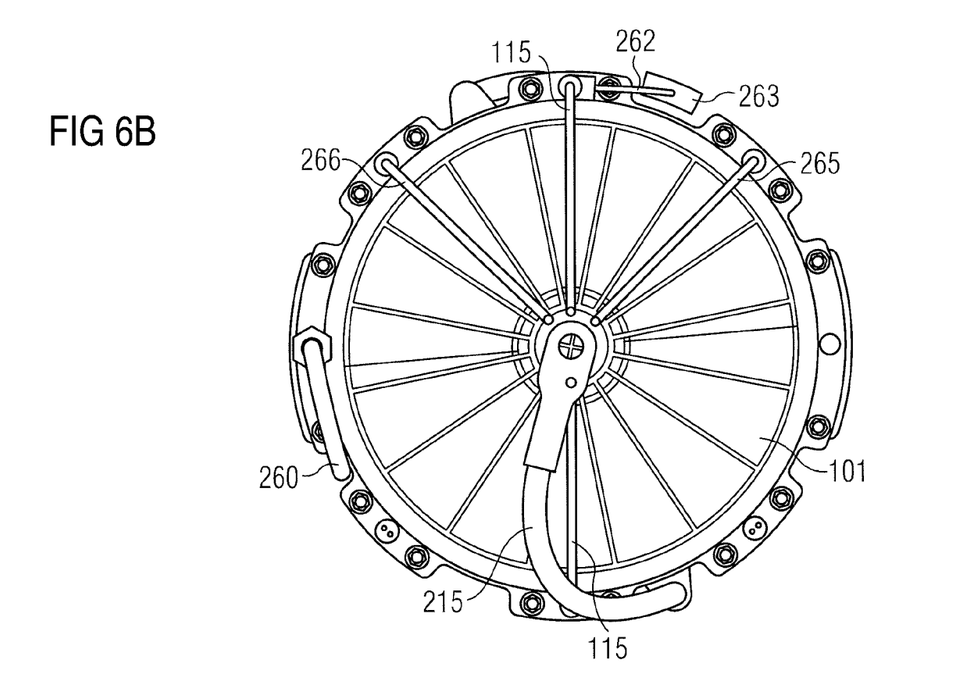

FIGS. 6A and 6B schematically illustrate a perspective view (FIG. 6A) and side view (FIG. 6B) of the opposite side of the electrolyzer 100 of FIGS. 5A and 5B. This side of the electrolyzer 100 also includes an electric cable 215 for applying an electric current to the electrolyzer 100, and an outlet of cooling fluid, to which a cooling fluid line 260 is coupled.

At this side, the electrolyzer 100 is connected to a fluid line 115, which guides water, electrolyte or the like to the electrolyzer 100 from a circuit circulating water, electrolyte or the like. Surplus water, electrolyte or the like may be guided from the electrolyzer towards the circuit via a fluid line 115 on the opposite side of the electrolyzer 100 illustrated in FIG. 5. Particularly, usually the electrolyzer 100 is provided with more water, electrolyte or the like than necessary, in order to always have a sufficient amount of fluid inside of the electrolyzer 100 for its operation. Of course, fluid lines 115 of FIGS. 5A,5B and 6A,6B may be operated in the opposite way, so that water, electrolyte or the like can be guided via a circuit to the electrolyzer 100 from the side of FIGS. 5A and 5B to the side of FIGS. 6A and 6B or vice versa. The fluid lines 115 illustrated in FIGS. 5A, 5B and 6A, 6B may also be used when flushing the electrolyzer 100. Likewise, gas ducts 265 and 266 may be provided and connected to the electrolyzer 100, for example, for flushing or venting process gas, such as oxygen and hydrogen, respectively, through the electrolyzer 100.

FIGS. 5A, 5B and 6A, 6B further illustrate that the ducts and cables running from one end plate 101 to the opposite end plate 101 can be arranged in a respective recess 104 provided in each end plate 101 and electrolyzer cells 102. This provides for a very compact electrolyzer 100 as well as compact electrolyzer assembly 10. As may be derived from the side views of FIGS. 5A, 5B and 6A, 6B, due to the arrangement of any duct and cable and a corresponding recess 104, the ring-shaped support 150 may not be necessary or may be integrated into an outer circumference of each end plate 101. Thus, an inner surface of the pressurized vessel 200 may directly lie on the outer circumference of each end plate 101 of the electrolyzer 100 (not illustrated for sake of legibility).

Figure 7:
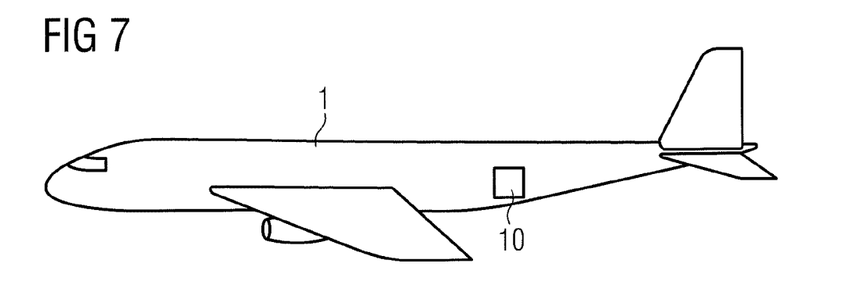
FIG. 7 schematically illustrates a vehicle.

FIG. 7 schematically illustrates a vehicle 1 comprising at least one electrolyzer assembly 10. While the vehicle 1 is illustrated as an aircraft, it is to be understood that any vehicle, including spacecrafts, cars, trains, etc. may be equipped with at least one electrolyzer assembly 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A high-pressure electrolyzer assembly, comprising:
a pressure vessel having two dome-shaped ends;
an electrolyzer arranged inside the pressure vessel; and,
a ring-shaped support having a first abutting portion abutting against an outer surface of the electrolyzer and a second abutting portion abutting against an inner surface of the pressure vessel, wherein at least one of the first abutting portion, the second abutting portion, or both are configured to slide,
wherein the pressure vessel is pressurized using an inert gas or a process gas of the electrolyzer.

2. The electrolyzer assembly according to claim 1, wherein
the electrolyzer is mounted to the ring-shaped support, or wherein the ring-shaped support is mounted to an inside of the pressure vessel.

3. The electrolyzer assembly according to claim 1, wherein the ring-shaped support comprises at least one spring element configured to provide a pressure force in a radial direction.

4. The electrolyzer assembly according to claim 1, wherein the pressure vessel has a cylindrically shaped main body portion between the two dome-shaped ends, and
wherein the ring-shaped support abuts only against an inside of the main body portion of the pressure vessel.

5. The electrolyzer assembly according to claim 4, further comprising:
a tension belt wrapped around the main body portion corresponding to a position of the ring-shaped support.

6. The electrolyzer assembly according to claim 1, further comprising:
a process gas exhaust connected to the electrolyzer and configured to collect process gas from the electrolyzer, wherein the process gas exhaust has an open end opening into an interior of the pressure vessel.

7. The electrolyzer assembly according to claim 1, further comprising:
a grommet for at least one of an electric cable or fluid line, wherein the grommet is arranged in one of the dome-shaped ends.

8. The electrolyzer assembly according to claim 7, further comprising:
a gas outlet comprising a gas duct with an open end opening into an interior of the pressure vessel, wherein the gas duct runs through the grommet towards an exterior of the pressure vessel.

9. The electrolyzer assembly according to claim 7, further comprising:
a gas inlet comprising a gas duct running through the grommet towards an interior of the pressure vessel, wherein the gas duct has an open end opening into an interior of the pressure vessel.

10. The electrolyzer assembly according to claim 1, further comprising:
a catalyst arranged in an interior of the pressure vessel and configured to facilitate a reaction of process gases of the electrolyzer into water.

11. The electrolyzer assembly according to claim 10, further comprising water collecting means configured to collect water generated by the catalyst.

12. The electrolyzer assembly according to claim 11, wherein the water collecting means is configured to feed the collected water to the electrolyzer.

13. The electrolyzer assembly according to claim 1, wherein the pressure vessel is made from metal.

14. The electrolyzer assembly according to claim 13, wherein the pressure vessel is a metallic liner with a composite overwrap forming a composite overwrapped pressure vessel.

15. A vehicle comprising:
at least one electrolyzer assembly according to claim 1.

* * * * *